United States Patent
Chir et al.

(10) Patent No.: US 8,596,956 B2
(45) Date of Patent: *Dec. 3, 2013

(54) BIDIRECTIONAL WATER TURBINE

(75) Inventors: Adam Chir, Derby (GB); Gregory Collecutt, Ashgrove (AU)

(73) Assignee: Rolls-Royce PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/522,523

(22) PCT Filed: Jan. 20, 2011

(86) PCT No.: PCT/EP2011/050741
§ 371 (c)(1),
(2), (4) Date: Aug. 6, 2012

(87) PCT Pub. No.: WO2011/095397
PCT Pub. Date: Aug. 11, 2011

(65) Prior Publication Data
US 2012/0321466 A1 Dec. 20, 2012

(30) Foreign Application Priority Data

Feb. 5, 2010 (GB) .................................. 1001870.3

(51) Int. Cl.
*F03B 13/26* (2006.01)
(52) U.S. Cl.
USPC .............................. 415/4.5; 415/908; 416/128

(58) Field of Classification Search
USPC ......... 415/3.1, 4.5, 191, 211.2, 908; 416/128, 416/155
See application file for complete search history.

(56) References Cited

U.S. PATENT DOCUMENTS

| | | | | |
|---|---|---|---|---|
| 3,986,787 A | * | 10/1976 | Mouton et al. | 415/7 |
| 5,242,265 A | * | 9/1993 | Hora et al. | 416/26 |
| 2005/0285407 A1 | | 12/2005 | Davis et al. | |
| 2008/0226450 A1 | | 9/2008 | Clarke et al. | |
| 2009/0058093 A1 | * | 3/2009 | Bridwell | 290/54 |

FOREIGN PATENT DOCUMENTS

CH          316900 A      12/1956

OTHER PUBLICATIONS

Oct. 27, 2011 International Search Report issued in International Patent Application No. PCT/EP2011/050741.
Oct. 27, 2011 Written opinion issued in International Patent Application No. PCT/EP2011/050741.

* cited by examiner

*Primary Examiner* — Edward Look
*Assistant Examiner* — Jason Davis
(74) *Attorney, Agent, or Firm* — Oliff & Berridge, PLC

(57) ABSTRACT

A bidirectional water turbine including: an upstream rotor and a downstream rotor, wherein the upstream rotor and downstream rotor are contra-rotating and each rotor includes a plurality of blade, the blades of the upstream and downstream rotors having substantially the same profile.

17 Claims, 3 Drawing Sheets

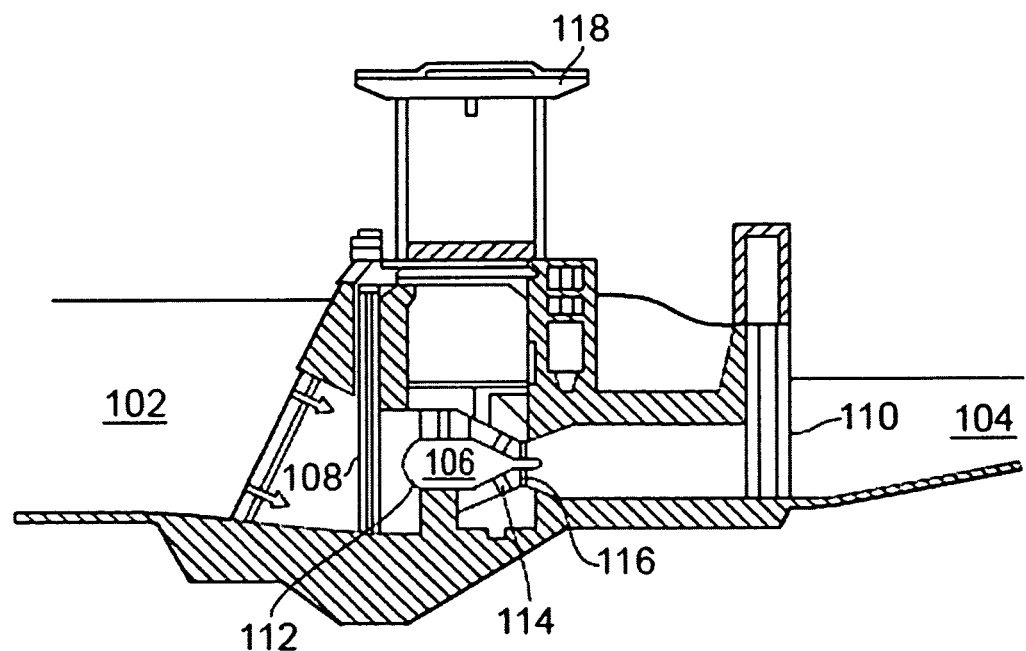
FIG. 1 - Prior Art
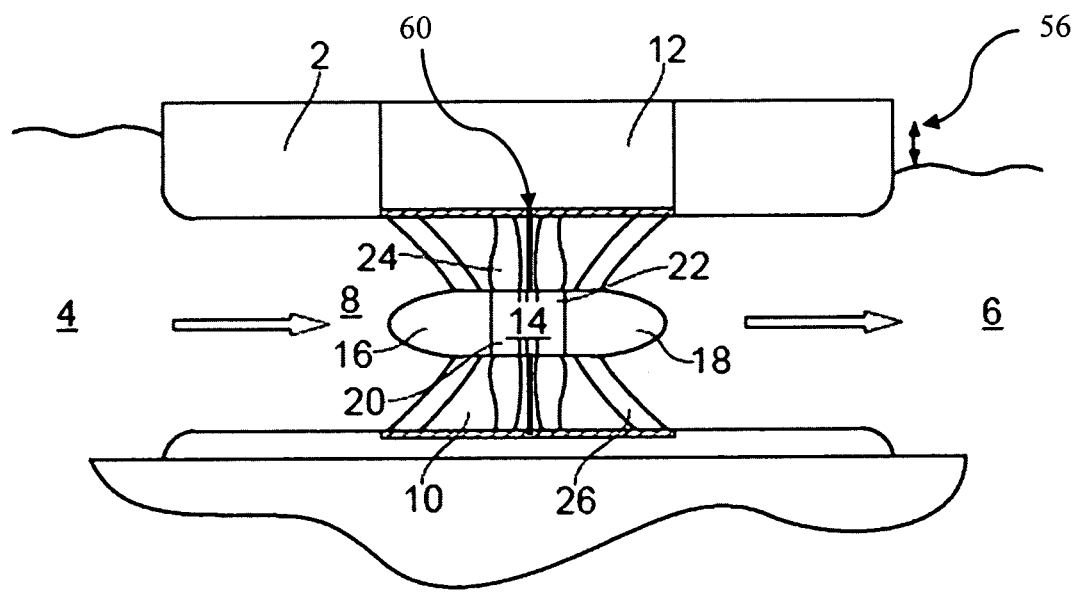
FIG. 2

BIDIRECTIONAL WATER TURBINE

This invention relates to a bidirectional water turbine, and particularly but not exclusively, to a bidirectional water turbine for use in a tidal barrage.

Tidal power harnesses the natural energy produced by the periodic rise and fall of the sea. These tides are created by the rotation of the Earth in the presence of the gravitational fields of the Sun and Moon.

Various methods may be employed to convert the energy of the tides into useful power. These methods broadly fall into two categories: tidal stream systems and tidal barrages.

Tidal stream systems operate in a similar manner to wind turbines and usually consist of a turbine which is rotated by the tidal current.

With a tidal barrage, water is allowed to flow into the area behind the barrage (for example, an estuary) through sluice gates during the flood tide. At high tide, the sluice gates are closed. Since the sea level falls during ebb tide, a head of water is created behind the barrage. Once the head of stored water is of sufficient height, the sluice gates are opened and the stored water is directed to flow through turbines housed within the barrage, thus converting the potential energy stored in the water into useful power.

A tidal barrage is in use on the Rance river in France. The Rance tidal barrage use 24 turbines, each capable of outputting 10 Megawatts of power. The turbines are low-head bulb turbines which capture energy from the 8 meter tidal range of the river using a 22.5 km$^2$ basin.

FIG. 1 shows a cross-section through a tidal barrage as used on the Rance river.

The tidal barrage separates an upstream side 102 and a downstream side 104. A passage is formed through the barrage in which a bulb turbine 106 is positioned. The flow of water through the passage and turbine 106 is controlled by first and second sluice gates 108, 110 located at either end of the passage.

The turbine 106 comprises a generator 112 at an upstream end of the turbine 106. The generator 112 is positioned centrally in the turbine 106 and water is forced to flow around the outside of the generator 112 over a set of stationary guide vanes 114 to a rotor 116. The rotor 116 is rotatably coupled to the generator 112 and comprises a plurality of blades. The blades of the rotor 116 have a hydrofoil cross-section which creates torque and rotates the rotor 116 when water flows past the rotor 116. This turns the generator 112 and thus produces useful power.

In order to carry out maintenance on the turbine 106, it is necessary to close the first and second sluice gates 108, 110 and lift the turbine 106 out of the passage using an overhead crane 118. Therefore, it is not possible to generate any power whilst the maintenance is being carried out.

The turbines used in the Rance tidal barrage were intended for bidirectional operation (i.e. generating on both ebb and flood tides). However, the low efficiency of the turbines during flood tide has meant that the turbines have only been used for ebb generation.

Furthermore, the turbines have reduced the biodiversity of the river because of the high attrition rate of fish as they pass through the turbines.

The present invention provides an improved turbine which addresses some or all of the above identified problems associated with the prior art turbine.

According to a first aspect of the invention, there is provided a bidirectional water turbine comprising: an upstream rotor and a downstream rotor, wherein the upstream rotor and downstream rotor are contra-rotating and each rotor comprises a plurality of blades, the blades of the upstream and downstream rotors having substantially the same non-dimensional profile.

The blades of the upstream and downstream rotors may have substantially the same camber which is typically non-zero. Additionally or alternatively, the blades of the upstream and downstream rotors may have substantially the same space-to-chord ratio and/or stagger. However the blades of the upstream and downstream rotors may be differently oriented. The blades of the upstream rotor may display opposite handedness to the blades of the downstream rotor. Additionally, the size or actual dimensions of the blades in the upstream and downstream rotors may differ.

The shape and orientation of the blades in the upstream and downstream rotors may be such as to produce a substantially zero net or exit swirl for the combined rotors.

The mounting of the blades on the rotors may allow for variable pitch blade configurations.

The use of contra-rotating upstream and downstream rotors is advantageous in that it substantially reduces the solidity of the rotor blades enabling both the upstream and downstream rotor cascades to be rotated through 180 degrees on the turn of tide such that the downstream rotor now performs the function of the upstream rotor and vice-versa. Furthermore, the contra-rotating upstream and downstream rotors reduce the degree of turning required across each blade, such that the efficiency of the blade at the root is higher and hub blockage may be reduced.

The upstream and downstream rotors may be substantially symmetrical about a plane located between the upstream and downstream rotors.

The blade profiles may not be completely symmetrical but typically produce broadly similar outlet stage swirl.

The hydrodynamically symmetrical rotor geometry ensures that the efficiency of the turbine remains high in both ebb and flood directions.

The said plane may be aligned in a radial direction relative to a longitudinal axis of the turbine.

The profile may be an average of an ideal unidirectional upstream blade profile and an ideal unidirectional downstream blade profile.

The number of blades of the upstream rotor may be different from the number of blades of the downstream rotor. This prevents wake loadings from the upstream rotor from impinging on multiple blades of the downstream rotor simultaneously, which would produce significant axial loadings that are detrimental to rotor life. The numbers of blades may be such that there is no common multiple between the upstream and downstream rotors.

The upstream rotor and downstream rotor may each comprise a hub to which the blades are attached, and the hubs may be profiled to prevent separation of exit flow.

The hubs may each be supported by a plurality of hydrodynamically profiled struts which may be angled away from their respective rotor.

Angling the struts away from the tip of the rotor blade minimises the wake loading at the point where the blade is fastest and the moment to the supporting structure greatest.

The struts may be located on an upstream side of the upstream rotor and on a downstream side of the downstream rotor.

The struts may be located between the upstream and downstream rotors.

The struts may support the hubs from a cylindrical casing.

A maintenance passage may be provided through the struts.

The maintenance passage may contain a ladder.

The struts may be oriented in a non-radial direction.

The non-radial orientation of the struts prevents the struts from lying parallel to the entire length of one of the blades. This reduces wake loading on the blade.

The struts may be curved along their length.

The bidirectional water turbine may further comprise a variable pitch mechanism for adjusting the pitch of the blades on the rotors.

The variable pitch mechanism permits the rotors to run at a defined, fixed speed enabling the use of a conventional, low-risk drive train arrangement.

Furthermore, the variable pitch mechanism allows the turbine to operate an efficient pump to maximise power extraction from the barrage and minimise environmental impact.

The variable pitch mechanism may adjust the pitch of the blades such that exit swirl from the downstream rotor is minimized and/or the downstream and upstream rotors rotate at the same speed.

The variable pitch mechanism may allow the blades to rotate through substantially 360 degrees.

This allows the variable pitch mechanism to redistribute lubrication and prevent uneven wear of the component parts.

A plurality of the bidirectional water turbines may used in a tidal barrage.

For a better understanding of the present invention and to show more clearly how it may be carried into effect, reference will now be made, by way of example, to the accompanying drawings, in which:—

FIG. 1 is a cross-section through a tidal barrage as used on the Rance river comprising a prior art turbine;

FIG. 2 is a schematic cross-section through a tidal barrage comprising a bidirectional water turbine in accordance with a first embodiment of the invention;

Figure 3:
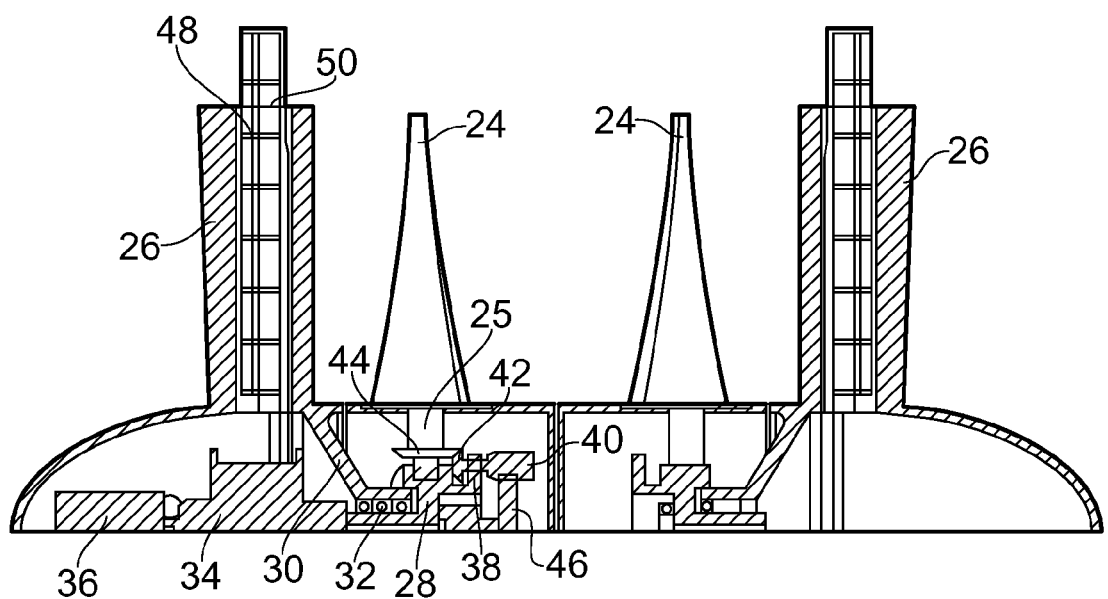
FIG. 3 is a detailed cross-section through the turbine of FIG. 2.

For a better understanding of the present invention and to show more clearly how it may be carried into effect, reference will now be made, by way of example, to the accompanying drawings, in which:—

FIG. 2 shows a cross-section through a tidal barrage 2. The tidal barrage 2 is typically constructed from concrete and steel and spans across the width of an estuary or other suitable feature separating it from the sea.

The tidal barrage 2 defines an upstream side 4 and a downstream side 6. A series of ducts 8 are formed through the width of the tidal barrage 2 allowing water to pass through the tidal barrage 2.

A bidirectional water turbine 10 according to an embodiment of the invention is positioned in each of the ducts 8. The turbine 10 is lowered through an access passage 12 formed in the top of the tidal barrage 2. A cylindrical casing 14 of the turbine 10 completes the duct 8 through the tidal barrage 2 and creates a smooth passageway for water to flow.

A hub assembly 14 is disposed along a longitudinal axis of the turbine 10. The hub assembly 14 comprises a upstream hub 16 and a downstream hub 18. The upstream and downstream hubs 16, 18 are profiled to prevent separation of exit flow.

An upstream rotor 20 is rotatably coupled to the upstream hub 16 and a downstream rotor 22 is rotatably coupled to the downstream hub 18 for rotation about the longitudinal axis of the turbine 10. Each of the upstream and downstream rotors 20, 22 comprise a plurality of blades 24 which are spaced radially around the rotor. The blades 24 extend from the rotor towards the casing 14, with a small clearance separating the tip of the blade 24 from the casing 14. The blades 24 have a hydrofoil cross-section. The orientation of the hydrofoil cross-section of the blades 24 is reversed for the upstream rotor and downstream rotors 20, 22. The number of blades on the upstream rotor 20 is different from the number of blades on the downstream rotor 22.

The upstream and downstream hubs 16, 18 are supported by a plurality of struts 26 which extend from the upstream and downstream hubs 16, 18 to positions located around the circumference of the casing 14. As shown in FIG. 3, the struts 26 are integrally formed with the upstream and downstream hubs 16, 18. Further struts 60 are provided between the upstream and downstream hubs 16, 18.

The struts 26 are hydrodynamically profiled to reduce their effect on the flow of water. Furthermore, the struts 20 are curved along their length in an axial direction and are angled away from their respective rotors 20, 22 so that the distance between the strut 26 and the rotor 20, 22 is greater at the end adjacent the casing 14 than at the end adjacent the hub 16, 18. The struts 26 are also curved or angled in a radial direction so that they are oriented in a non-radial direction. The non-radial orientation of the struts 26 prevents the struts 26 from lying parallel to the entire length of one of the blades 24.

FIG. 3 shows a more detailed cross-section of the turbine 10. The blades 24 of the upstream and downstream rotors 20, 22 are attached at their root 25 to a driveshaft 28 (only shown for the upstream rotor 20). The driveshaft 28 rotates within a collar 30 fixed to the struts 26. To allow free rotation of the driveshaft 28 within the collar 30, a set of bearings 32 is provided between the surfaces of the driveshaft 28 and the collar 30.

The driveshaft 28 drives a transmission 34, such as an epicyclic gearbox. In turn, the transmission drives an electrical generator 36, such as a synchronous machine. The electrical generator 36 produces electrical power from the rotation of the driveshaft 28.

The roots 25 of the blades 24 of each of the upstream and downstream rotors 20, 22 are connected to a variable pitch mechanism 38. The variable pitch mechanism 38 comprises an electric motor 40 which drives a gear 42. The gear 42 meshes with a bevel gear 44 which is connected to the root 25 of the blade 24 and thus rotation of the electric motor 40 is converted into rotation of the blade 24. The electric motor 40 is connected to a supporting structure 46 to ensure that it rotates with the rotor.

As shown in FIG. 3, the struts 26 are hollow providing a maintenance passage 48 for the turbine 10. The maintenance passage 48 houses a ladder 50 giving maintenance personal access to the inside of the turbine 10 to repair and/or inspect the internal components of the turbine 10, such as the electrical generator 36.

Figure 4:
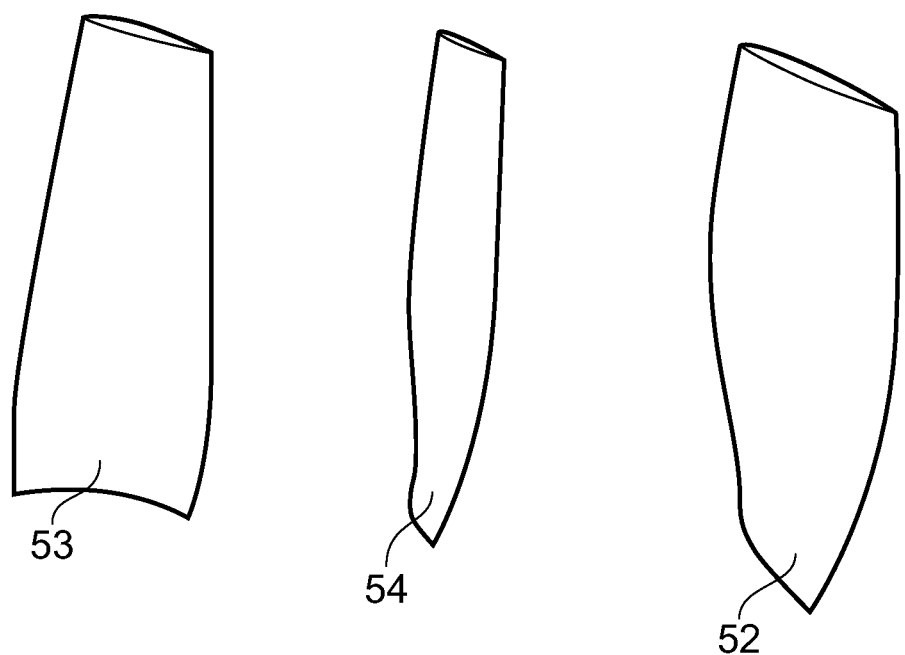
FIG. 4 is a perspective view of a blade of the turbine of FIG. 2.

The blades 24 of the upstream and downstream rotors 20, 22 have substantially the same profile. The profile of the blades 24 is determined by producing an average profile 52 of the ideal uni-directional upstream 53 and downstream 54 blade profiles, as shown in FIG. 4. The upstream and downstream rotors 20, 22 are therefore substantially symmetrical about a plane located between the upstream and downstream rotors 20, 22.

In use, the turbine 10 separates the water on the upstream side 4 of the turbine 10 from downstream side 6 side of the turbine 10. The water is prevented from passing through the turbine 10, for example, using a sluice (not shown). As the tide goes out a head of stored water is formed, indicated by arrow 56 in FIG. 2. When the sluice is opened the stored water is allowed to flow through the turbine. The water acts on the blades 24 of the upstream rotor 20, which creates a torque on the upstream rotor as a result of the hydrofoil cross-section of the blades 24. Consequently, the upstream rotor 20 rotates. Similarly, the water acts on the blades 24 of the downstream rotor 22, which creates a torque on the downstream rotor 22. Since the hydrofoil cross-section of the blades 24 of the downstream rotor 22 is oriented in the opposite direction to that of the upstream rotor 20, the downstream rotor 22 rotates in the opposite direction to the upstream rotor 20.

The rotation of the upstream and downstream rotors 20, 22 drives the electrical generator 36, thus producing useful power.

The upstream rotor 20 introduces swirl into the incoming flow while the downstream rotor 22 removes this swirl. The variable pitch mechanism 38 is actuated electrically to adjust the pitching of both the upstream and downstream rotors 20, 22 such that the exit swirl from the downstream rotor 22 is ideally zero and both rotors 20, 22 run at constant speed.

To increase the head of water, the turbine 10 may be operated as a pump. By inputting power to the turbine 10, the generator 36 operates as a motor and the upstream and downstream rotors 20, 22 rotate pumping water from the downstream side 6 to the upstream side 4.

During flood tide, the upstream rotor 20 becomes the downstream rotor 22 and the downstream rotor 22 becomes the upstream rotor 20. However, the operation of the turbine is unchanged, since the upstream and downstream rotors 20, 22 are symetrical and have the same blade profiles.

Minor maintenance may be carried out on the turbine 10 using the maintenance passage 48 and ladder 50 to access the inside of the turbine 10.

Although the present invention has been described with reference to a tidal barrage, the turbine 10 may alternatively be run in a free stream (i.e. no duct or barrage) environment.

The transmission 34 need not be an epicyclic gearbox but is preferably a mechanical, magnetic or hydraulic gearbox. Furthermore, the transmission 34 may be eliminated entirely and a permanent magnet direct-drive electrical generator used.

Alternative embodiments of the variable pitch mechanism 38 could be used. For example, the variable pitch mechanism 38 may be actuated by a single large gear ring meshing with the bevel gear 44 driven at multiple points by electrical drive. Alternatively, the variable pitch mechanism 38 may be actuated by an eccentric pin and linear drive mechanism. The variable pitch mechanism 38 is advantageously electrically, mechanically or hydraulically actuated.

Square-to-round transition pieces may be installed on the upstream and downstream sides 4, 6 of the turbine 10 to permit installation in a square duct and minimise expansion and contraction losses.

The invention claimed is:

1. A bidirectional water turbine comprising:
an upstream rotor and a downstream rotor, wherein the upstream rotor and downstream rotor are contra-rotating and each rotor comprises a plurality of blades, wherein the blades of the upstream and downstream rotors have substantially the same non-zero camber, and the upstream and downstream rotors are substantially symmetrical about a plane located between the upstream and downstream rotors, and wherein the blades of the upstream and downstream rotors are opposite handed.

2. The bidirectional water turbine as claimed in claim 1, wherein the said plane is aligned in a radial direction relative to a longitudinal axis of the turbine.

3. The bidirectional water turbine as claimed in claim 1, wherein the number of blades of the upstream rotor is different from the number of blades of the downstream rotor.

4. The bidirectional water turbine as claimed in claim 1, wherein the upstream rotor and downstream rotor each comprise a hub to which the blades are attached, wherein the hubs are profiled to prevent separation of exit flow.

5. The bidirectional water turbine as claimed in claim 4, wherein the hubs are each supported by a plurality of hydrodynamically profiled struts which are angled away from their respective rotor.

6. The bidirectional water turbine as claimed in claim 5, wherein the struts are located on an upstream side of the upstream rotor and on a downstream side of the downstream rotor.

7. The bidirectional water turbine as claimed in claim 5, wherein the struts are located between the upstream and downstream rotors.

8. The bidirectional water turbine as claimed in claim 5, wherein the struts support the hubs from a cylindrical casing.

9. The bidirectional water turbine as claimed in any claim 5, wherein a maintenance passage is provided through the struts.

10. The bidirectional water turbine as claimed in claim 9, wherein the maintenance passage contains a ladder.

11. The bidirectional water turbine as claimed in claim 5, wherein the struts are oriented in a non-radial direction.

12. The bidirectional water turbine as claimed in claim 11, wherein the struts are curved along their length.

13. The bidirectional water turbine as claimed in claim 1, further comprising a variable pitch mechanism for adjusting the pitch of the blades on the rotors.

14. The bidirectional water turbine as claimed in claim 13, wherein the variable pitch mechanism adjusts the pitch of the blades such that exit swirl from the downstream rotor is minimized and/or the downstream and upstream rotors rotate at the same speed.

15. The bidirectional water turbine as claimed in claim 13, wherein the variable pitch mechanism allows the blades to rotate through at least 180 degrees.

16. The bidirectional water turbine as claimed in claim 13, wherein the variable pitch mechanism allows the blades to rotate through substantially or at least 360 degrees.

17. The bidirectional water turbine as claimed in claim 1, wherein the blades of the upstream and downstream rotors have substantially the same space to chord ratio and/or stagger.

* * * * *